US010832461B2

(12) United States Patent
Kim et al.

(10) Patent No.: US 10,832,461 B2
(45) Date of Patent: Nov. 10, 2020

(54) METHOD AND APPARATUS FOR EDITING UPLOADED IMAGE

(71) Applicants: SK Planet Co., Ltd., Seongnam-si (KR); Eleven Street Co., Ltd., Seoul (KR)

(72) Inventors: KiHyun Kim, Daejeon (KR); HaYoon Kim, Seongnam-si (KR)

(73) Assignees: SK Planet Co., Ltd., Seongnam-si (KR); Eleven Street Co., Ltd., Seoul (KR)

( * ) Notice: Subject to any disclaimer, the term of this patent is extended or adjusted under 35 U.S.C. 154(b) by 0 days.

(21) Appl. No.: 16/410,834

(22) Filed: May 13, 2019

(65) Prior Publication Data

US 2020/0013207 A1 Jan. 9, 2020

(30) Foreign Application Priority Data

Jul. 5, 2018 (KR) .................. 10-2018-0078051

(51) Int. Cl.
*G06T 11/60* (2006.01)
*G06T 7/155* (2017.01)
*G06K 9/00* (2006.01)

(52) U.S. Cl.
CPC .............. *G06T 11/60* (2013.01); *G06T 7/155* (2017.01); *G06K 9/00228* (2013.01); *G06T 2207/30201* (2013.01)

(58) Field of Classification Search
None
See application file for complete search history.

(56) References Cited

U.S. PATENT DOCUMENTS

2008/0025573 A1\* 1/2008 Nishi ................. G06K 9/00234
382/115
2013/0162817 A1\* 6/2013 Bernal ............... G06K 9/00228
348/143

OTHER PUBLICATIONS

Arbelaez, Pablo, et al. "Contour detection and hierarchical image segmentation." IEEE transactions on pattern analysis and machine intelligence 33.5 (2010): 898-916.\*

\* cited by examiner

*Primary Examiner* — Zhengxi Liu
(74) *Attorney, Agent, or Firm* — Fenwick & West LLP

(57) ABSTRACT

A method and apparatus for editing an uploaded image are provided. A controller of the apparatus receives the uploaded image that contains an article area showing an image of a purchased article and a personal information area showing personal information. The controller identifies the article area and the personal information area in the received image, edits the received image to protect the personal information without damaging the article area, and posts the edited image to a webpage.

12 Claims, 8 Drawing Sheets

(A)   (B)   (C)

(D)   (E)

(A)

(B)

(C)

(D)

(E)

(A)

(B)

(C)

(D)

(E)

(F)

METHOD AND APPARATUS FOR EDITING UPLOADED IMAGE

CROSS-REFERENCE TO RELATED APPLICATIONS

The present application is based upon and claims the benefit of priority to Republic of Korea Patent Application No. 10-2018-0078051, filed on Jul. 5, 2018. The disclosure of the above application is hereby incorporated by reference herein in their entirety.

TECHNICAL FIELD

The present disclosure relates to an image editing technique and, particularly, to a method and apparatus for editing an image uploaded to a website so as not to expose personal information contained in the uploaded image.

BACKGROUND ART

Many shopping mall websites are used currently and widely. These shopping mall websites offer various benefits to a customer who registers a review about a purchased article. Also, when a customer uploads a photograph image showing an actual use of a purchased article, the websites offer more benefits.

By the way, there are cases where uploaded photograph images contain personal information such as a face of a customer. In addition, there are frequent cases of unauthorized uses of these images by someone. Therefore, protection of personal information is required to prevent personal information from being exposed from uploaded images.

SUMMARY

According to the present disclosure, provided are a method and apparatus for editing an image uploaded to a website so that personal information contained in the uploaded image is not exposed.

According to embodiments of the present disclosure, a method for editing an uploaded image, performed by a controller of an apparatus, comprises receiving the uploaded image containing an article area showing an image of a purchased article and a personal information area showing personal information; identifying the article area and the personal information area in the received image; editing the received image to protect the personal information without damaging the article area; and posting the edited image to a webpage.

In the method, the editing of the received image may include determining whether the personal information area is adjacent to the article area; and when the personal information area is not adjacent to the article area, masking all of the personal information area.

In the method, the editing of the received image may further include, when the personal information area is adjacent to the article area, determining whether a ratio occupied by the personal information area in the received image is greater than a given ratio; and when the ratio of the personal information area is smaller than the given ratio, masking a part of the personal information area.

In the method, the editing of the received image may further include, when the ratio of the personal information area is greater than the given ratio, creating a new image by partially extracting the personal information area.

In the method, the identifying of the article area and the personal information area may include detecting line components from the received image through morphology analysis; specifying a plurality of closed curves from the detected line components; dividing the received image into a plurality of areas, based on the closed curves; and identifying the article area and the personal information area from the respective areas in the received image by recognizing an image of each area.

According to embodiments of the present disclosure, an apparatus for editing an uploaded image comprises a communication circuit configured to receive the uploaded image from a user device, the uploaded image containing an article area showing an image of a purchased article and a personal information area showing personal information; and a controller configured to receive the uploaded image from the communication circuit, to identify the article area and the personal information area in the received image, to edit the received image to protect the personal information without damaging the article area, and to post the edited image to a webpage.

In the apparatus, the controller may be further configured to determine whether the personal information area is adjacent to the article area, and when the personal information area is not adjacent to the article area, to mask all of the personal information area.

In the apparatus, the controller may be further configured to, when the personal information area is adjacent to the article area, determine whether a ratio occupied by the personal information area in the received image is greater than a given ratio, and to, when the ratio of the personal information area is smaller than the given ratio, mask a part of the personal information area.

In the apparatus, the controller may be further configured to, when the ratio of the personal information area is greater than the given ratio, create a new image by partially extracting the personal information area.

In the apparatus, the controller may be further configured to detect line components from the received image through morphology analysis, to specify a plurality of closed curves from the detected line components, to divide the received image into a plurality of areas, based on the closed curves, and to identify the article area and the personal information area from the respective areas in the received image by recognizing an image of each area.

When a user uploads a photograph image showing an actual use of a purchased article to a website as a review, the method and apparatus according to the present disclosure can edit the uploaded image by masking personal information without damaging an article image and then post the edited image on the website. Therefore, the user can upload the photograph image to the website without worrying about leakage of his/her personal information.

DETAILED DESCRIPTION

Figure 1:
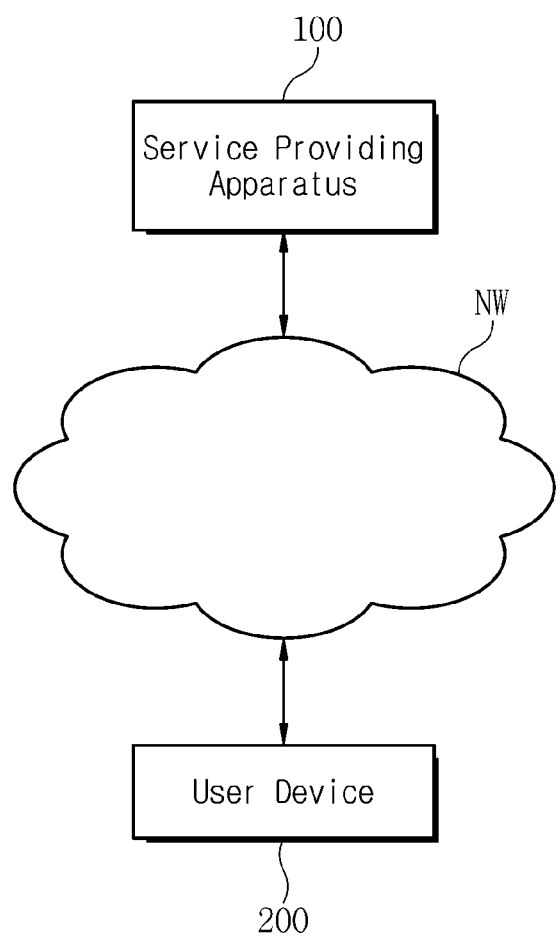
FIG. 1 is a diagram illustrating a system for editing an uploaded image according to an embodiment of the present disclosure.

Now, embodiments of the present disclosure will be described in detail with reference to the accompanying drawings.

However, in the following description and the accompanying drawings, well known techniques may not be described or illustrated in detail to avoid obscuring the subject matter of the present disclosure. Through the drawings, the same or similar reference numerals denote corresponding features consistently.

The terms and words used in the following description, drawings and claims are not limited to the bibliographical meanings thereof and are merely used by the inventor to enable a clear and consistent understanding of the disclosure. Thus, it will be apparent to those skilled in the art that the following description about various embodiments of the present disclosure is provided for illustration purpose only and not for the purpose of limiting the disclosure as defined by the appended claims and their equivalents.

Additionally, the terms including expressions "first", "second", etc. are used for merely distinguishing one element from other elements and do not limit the corresponding elements. Also, these ordinal expressions do not intend the sequence and/or importance of the elements.

Further, when it is stated that a certain element is "coupled to" or "connected to" another element, the element may be logically or physically coupled or connected to another element. That is, the element may be directly coupled or connected to another element, or a new element may exist between both elements.

In addition, the terms used herein are only examples for describing a specific embodiment and do not limit various embodiments of the present disclosure. Also, the terms "comprise", "include", "have", and derivatives thereof mean inclusion without limitation. That is, these terms are intended to specify the presence of features, numerals, steps, operations, elements, components, or combinations thereof, which are disclosed herein, and should not be construed to preclude the presence or addition of other features, numerals, steps, operations, elements, components, or combinations thereof.

Also, in the following description, especially in claims, singular forms are intended to include plural forms unless the context clearly indicates otherwise. That is, the terms "a", "an", "one", and "the" may be used as both singular and plural meanings unless the context clearly indicates otherwise.

The term "module" or "unit" used herein may refer to a hardware or software component or device, such as a field programmable gate array (FPGA) or application specific integrated circuit (ASIC), which performs at least one particular function, operation, or task. A module or unit may be configured to reside on an addressable storage medium and configured to execute on one or more processors.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In the description and claims, the term "network" or "communication network" is defined as one or more data links that enable electronic data to be transmitted between computer systems and/or modules. When any information is transferred or provided to a computer system via a network or other (wired, wireless, or a combination thereof) communication connection, this connection can be understood as a computer-readable medium. The computer-readable instructions include, for example, instructions and data that cause a general purpose computer system or special purpose computer system to perform a particular function or group of functions. The computer-executable instructions may be binary, intermediate format instructions, such as, for example, an assembly language, or even source code.

In addition, the disclosure may be implemented in network computing environments having various kinds of computer system configurations such as PCs, laptop computers, handheld devices, multiprocessor systems, microprocessor-based or programmable consumer electronics, network PCs, minicomputers, mainframe computers, mobile phones, PDAs, pagers, and the like. The disclosure may also be implemented in distributed system environments where both local and remote computer systems linked by a combination of wired data links, wireless data links, or wired and wireless data links through a network perform tasks. In such distributed system environments, program modules may be located in local and remote memory storage devices.

Now, a system for editing an uploaded image will be described. FIG. 1 is a diagram illustrating a system for editing an uploaded image according to an embodiment of the present disclosure. Referring to FIG. 1, the image editing system includes a service providing apparatus 100 and a user device 200.

The service providing apparatus 100 and the user device 200 transmit and receive data therebetween through a network (NW). Depending on system implementation schemes, the network may include a wireless communication network such as a wireless local area network (WLAN), Wi-Fi, Wibro, Wimax, or a high speed downlink packet access (HSDPA), and/or a wired communication network such as Ethernet, xDSL (ADSL or VDSL), a hybrid fiber coaxial cable (HFC), a fiber to the curb (FTTC), or a fiber to the home (FTTH).

In addition, the network may include a mobile communication network composed of a plurality of radio access networks (not shown) and a core network (not shown) that connects the radio access networks. The radio access networks perform radio communication with user devicees. The radio access network may include a base station (BS) which is also referred to as a base transceiver station (BTS), NodeB, or evolved NodeB (eNodeB or eNB), and a controller which is also referred to as a base station controller (BSC) or a radio network controller (RNC). A digital signal processor and a radio signal processor, which are implemented integrally with the base station, may be separated as a digital unit (DU) and a radio unit (RU) from the base station, respectively. Such RUs may be disposed in a plurality of regions, respectively, and connected to a centralized DU.

The core network performs main functions for a mobile communication service such as mobility control and switching between the radio access networks. In addition, the core network performs circuit switching or packet switching and also manages and controls a packet flow in the mobile network. Additionally, the core network may manage mobility between frequencies, control traffic therein and in the access networks, and control interworking with other network such as the Internet. The core network may include a serving gateway (SGW), a packet data network (PDN) gateway (PGW), a mobile switching center (MSC), a home location register (HLR), a mobile mobility entity (MME), a home subscriber server (HSS), and/or the like.

In addition, the network may include the Internet which is a publicly available communication network, i.e., a public network, in which information is exchanged in accordance with TCP/IP protocol. Interacting with each other through the network, the service providing apparatus 100 and the user device 200 constitute the image editing system according to the present disclosure.

The service providing apparatus 100 is one of entities existing on the network and may also operate as or access a web server, a database server, and an application server. In one embodiment, the service providing apparatus 100 may perform functions of the web server for providing a shopping mall website. In the following description, it is assumed that the service providing apparatus 100 is a server that provides an Internet shopping mall service for selling various kinds of articles of commerce. Thus, the service providing apparatus 100 may provide a webpage that contains a bulletin board in which a customer registers a review about a purchased article.

The user device 200, also referred to as a user terminal, etc., may be a mobile communication terminal. However, the user device 200 is not limited thereto and may be any kind of an information communication device, a multimedia terminal, a wired terminal, a stationary terminal, or an Internet protocol (IP) terminal. The user device 200 may be, for example, a mobile or portable electronic device capable of mobile communication, including a mobile phone, a portable multimedia player (PMP), a mobile Internet device (MID), a smart phone, a tablet PC, or a phablet PC. In another example, the user device 200 may be a notebook, a personal computer (PC), or the like.

According to an embodiment of the present disclosure, the user device 200 generates an image by photographing a state in which the user actually uses the purchased article (e.g., wearing the purchased clothing). Then, the user device 200 uploads the generated image to the service providing apparatus 100 as a review of the purchased article. The uploaded image includes an article area showing an image of the purchased article and a personal information area showing personal information (e.g., a user's face). The service providing apparatus 100 edits the uploaded image without damaging the article area so that the personal information is not exposed, and then posts the edited image on the website. Accordingly, the posted image can attain both the purpose of providing an article review and the purpose of protecting personal information.

Figure 2:
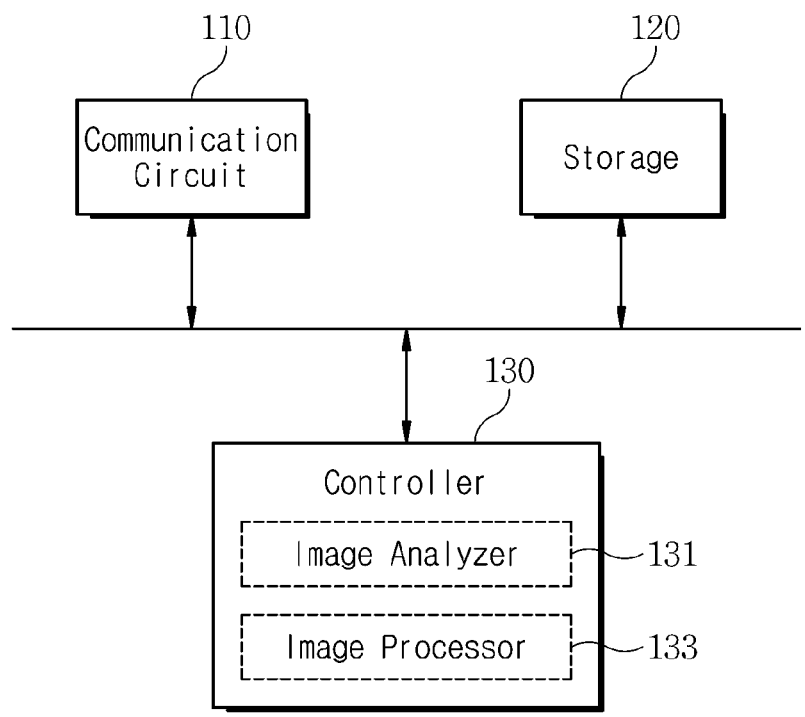
FIG. 2 is a block diagram illustrating a service providing apparatus according to an embodiment of the present disclosure.

Now, the service providing apparatus 100 and the user device 200 will be described in detail. First, the service providing apparatus 100 will be described. FIG. 2 is a block diagram illustrating a service providing apparatus according to an embodiment of the present disclosure. Referring to FIG. 2, the service providing apparatus 100 includes a communication circuit 110, a storage 120, and a controller 130.

The communication circuit 110 is configured to communicate with the user device 200. For example, when the user device 200 accesses the service providing apparatus 100 through the network, the communication circuit 110 performs communication for exchanging necessary information or data with the user device 200. Specifically, when receiving data (e.g., a webpage for commodity sales) from the controller 130, the communication circuit 110 composes a packet from the received data and transmits the packet to the user device 200. In addition, the communication circuit 110 extracts data (e.g., an uploaded photograph image) from a packet received from the user device 200 and delivers the extracted data to the controller 130.

The storage 120 is configured to store programs and data necessary for the operation of the service providing apparatus 100 and may be divided into a program region and a data region. The program region stores a program for controlling the overall operation of the service providing apparatus 100, an operating system (OS) for booting the service providing apparatus 100, an application for an image search, and the like. The data region stores various kinds of data generated by or required for the operation of the service providing apparatus 100. The data stored in the storage 120 may be a plurality of web pages constituting a shopping mall website, various scripts necessary for operating a bulletin board, and the like. In addition, the data stored in the storage 120 may be images, texts, etc. uploaded by the user. Such data stored in the storage 120 may be deleted, modified or added in response to a user's manipulation.

The controller 130 is configured to control the overall operation of the service providing apparatus 100, to control a signal flow between internal components of the service providing apparatus 100, and to perform a data processing function. The controller 130 may be a central processing unit (CPU) or at least one processor.

The controller 130 includes an image analyzer 131 and an image processor 133. The image analyzer 131 divides the uploaded image into a plurality of areas, and identifies each of the plurality of areas as an article area or a personal information area. In addition, the image analyzer 131 determines whether the article area is adjacent to the personal information area, and also determines the ratio of the personal information area in the entire image. Meanwhile, the image processor 133 edits the image without damaging the article area so that the personal information is not exposed, based on a relationship between the article area and the personal information area. The operation of the controller 130 including the image analyzer 131 and the image processor 133 will be described in more detail below.

Figure 3:
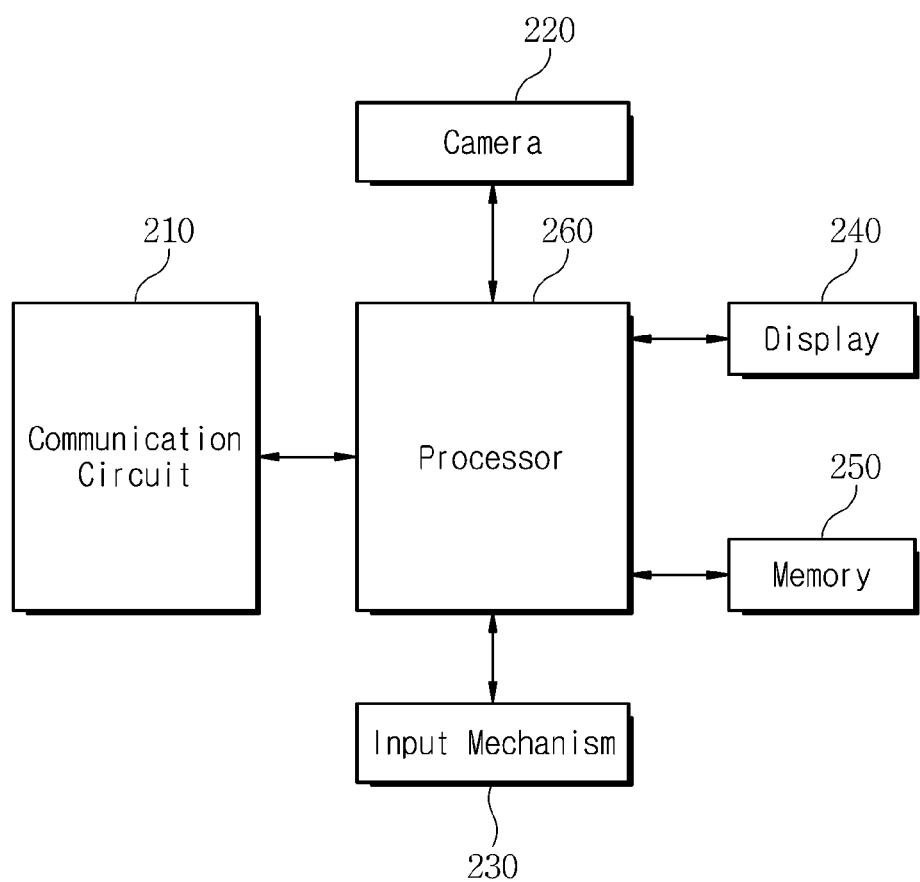
FIG. 3 is a block diagram illustrating a user device according to an embodiment of the present disclosure.

Next, the user device 200 will be described. FIG. 3 is a block diagram illustrating a user device according to an embodiment of the present disclosure. Referring to FIG. 3, the user device 200 includes a communication circuit 210, a camera 220, an input mechanism 230, a display 240, a memory 250, and a processor 260.

The communication circuit 210 is configured to communicate with other devices including the service providing apparatus 100 via various communication schemes. For communication, the communication circuit 210 may select one of communication functions based on various communication schemes. In addition, the communication circuit 210 may be implemented with one or more modules. For example, the communication circuit 210 may use a broadband mobile communication scheme of accessing a network through a base station in accordance with a standard such as WCDMA, LTE, or LTE-A, use a wireless short-range communication scheme of accessing a network and performing communication through an access point (AP) in a wireless local area network (WLAN) system using wireless fidelity (Wi-Fi), or use a peer-to-peer (P2P) scheme of directly connecting and communicating with other devices in an industrial scientific and medical equipment (ISM) band such as Bluetooth or infrared communication. In addition, the communication circuit 210 may include a radio frequency (RF) transmitter for up-converting the frequency of an outgoing signal and amplifying the signal, an RF receiver for low-noise-amplifying an incoming signal and down-converting the frequency of the signal, and the like. The communication circuit 210 may receive a radio signal including data (e.g., a webpage) via a radio channel and deliver the data to the processor 260. Also, the communication circuit 210 may receive data (e.g., a photograph image to be uploaded) from the processor 260, convert the data into a radio signal, and transmit the signal via a radio channel.

The camera 220 includes an image sensor and performs a photographing function. The image sensor receives light reflected from a subject and converts the received light into an electric signal. The image sensor may be implemented based on a charge coupled device (CCD) or a complementary metal-oxide semiconductor (CMOS). The camera 220 may further include an analog-to-digital converter, which converts an analog signal outputted from the image sensor into a digital signal and outputs the digital signal to the processor 260.

The input mechanism 230 is configured to receive a user's input manipulation for controlling the user device 200, to generate a corresponding input signal, and to deliver it to the processor 260. The input mechanism 230 may include a power key, alphanumeric keys, navigation keys, and/or function keys. When the display 240 is formed of a touch screen, some functions of the input mechanism 230 may be performed by the display 240. If all input functions are available on the touch screen, the input mechanism 230 may be omitted.

The display 240 is configured to visually offer, to the user, a menu of the user device 200, input data, function setting information, and any other information. In particular, the display 240 may display an image photographed by the camera 220 under the control of the processor 260. In addition, the display 240 performs a function of outputting various kinds of screens, such as a booting screen, an idle screen, and a menu screen, of the user device 200. The display 240 may be formed of a liquid crystal display (LCD), an organic light emitting diode (OLED), an active matrix OLED (AMOLED), or the like. In a certain embodiment, the display 240 may be implemented with a touch screen. In this case, the display 240 may include a touch sensor, and the processor 260 may recognize a user's touch input through the touch sensor. The touch sensor may be formed of a touch-sensitive sensor of capacitive overlay type, pressure type, resistive overlay type, or infrared beam type, or formed of a pressure sensor. In addition to the above sensors, any type of sensor device capable of detecting the contact or pressure of an object may be used for the touch sensor. The touch sensor senses a user's touch input, generates a sensing signal, and transmits the sensing signal to the processor 260. The sensing signal includes coordinate data corresponding to the user's touch input. If the user enters a touch-and-drag input, the sensing signal includes coordinate data of a touch-and-drag path.

The memory 250 is configured to store programs and data necessary for the operation of the user device 200 and may be divided into a program region and a data region. The program region stores a program for controlling the overall operation of the user device 200, an operating system (OS) for booting the user device 200, various kinds of applications, and the like. The data region stores data generated by the user device 200. In addition, the memory 250 may store various kinds of data generated according to the operation of the user device 200.

The processor 260 is configured to control the overall operation of the user device 200, to control a signal flow between internal components of the user device 200, and to perform a data processing function. The processor 260 may be a central processing unit (CPU), an application processor (AP), a graphic processing unit (GPU), and/or the like. The operation of the processor 260 will be described below in more detail.

Figure 4:
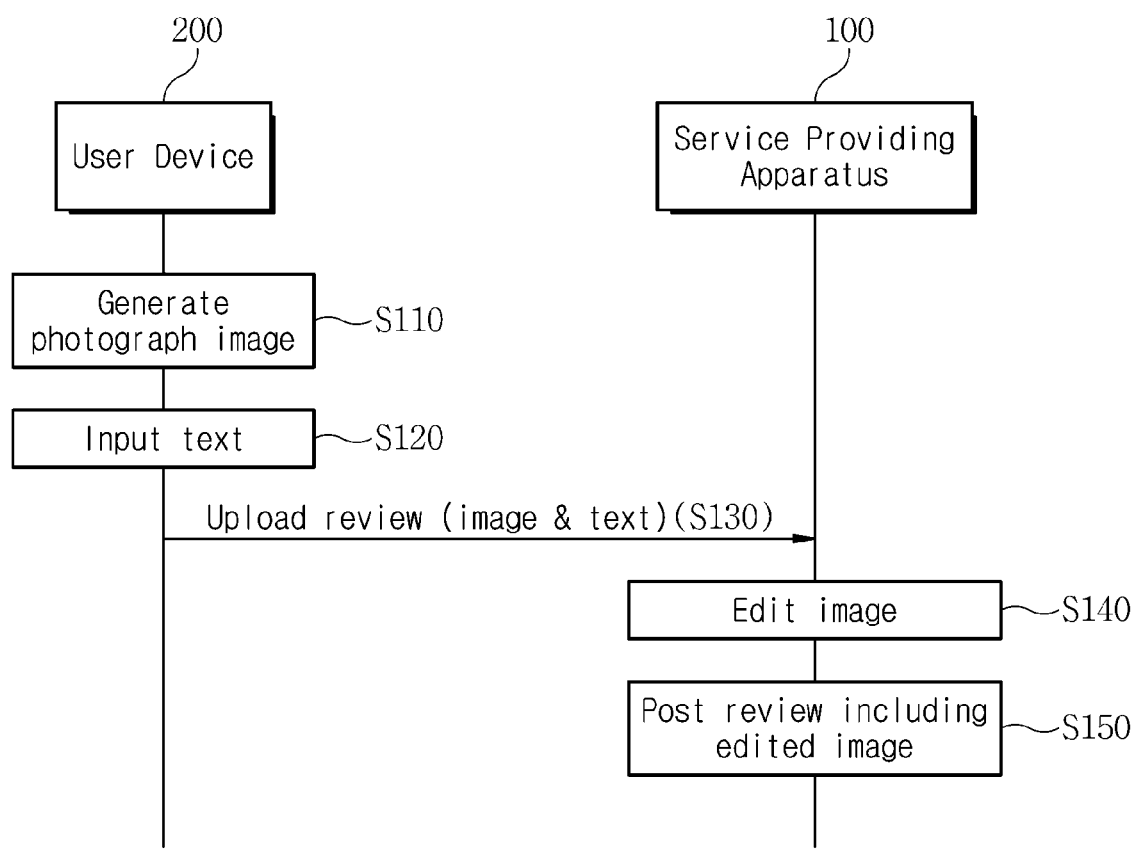
FIG. 4 is a flow diagram illustrating a method for editing an uploaded image according to an embodiment of the present disclosure.

Now, a method for editing an uploaded image will be described. FIG. 4 is a flow diagram illustrating a method for editing an uploaded image according to an embodiment of the present disclosure.

It is assumed that the user is a customer who purchases a certain article of commerce from an Internet shopping mall provided by the service providing apparatus 100. It is also assumed that the user wants to photographs a state of actually using the purchased article (e.g., wearing the purchased clothing) and upload a photograph image to the service providing apparatus 100 as a review about the purchased article.

Referring to FIG. 4, at step S110, the processor 260 of the user device 200 receives a user's photographing request through the input mechanism 230 or the display 240, and generates a photograph image, as a part of a review about a purchased article, through the camera 220.

In addition, at step S120, the processor 260 receives a user's text input via the input mechanism 230 or the display 240. The inputted text is another part of the review.

Then, at step S130, the processor 260 uploads the review including the inputted text and the generated image to the service providing apparatus 100 via the communication circuit 210.

The controller 130 of the service providing apparatus 100 receives the review from the user device 200 through the communication circuit 110. Then, at step S140, the controller 130 edits the image included in the received review so that personal information contained in the image is not exposed.

Then, at step S150, the controller 130 posts the review including the edited image on the webpage. That is, the controller 130 stores the received text and the edited image in the storage 120 as a user review, creates a link of the stored review, and inserts the generated link into a bulletin board of the web page.

As described above, according to embodiments of the present disclosure, it is possible to protect user's personal information contained in an uploaded image by editing the uploaded image so as not to expose the personal information before posting the uploaded image on a webpage.

Figure 5:
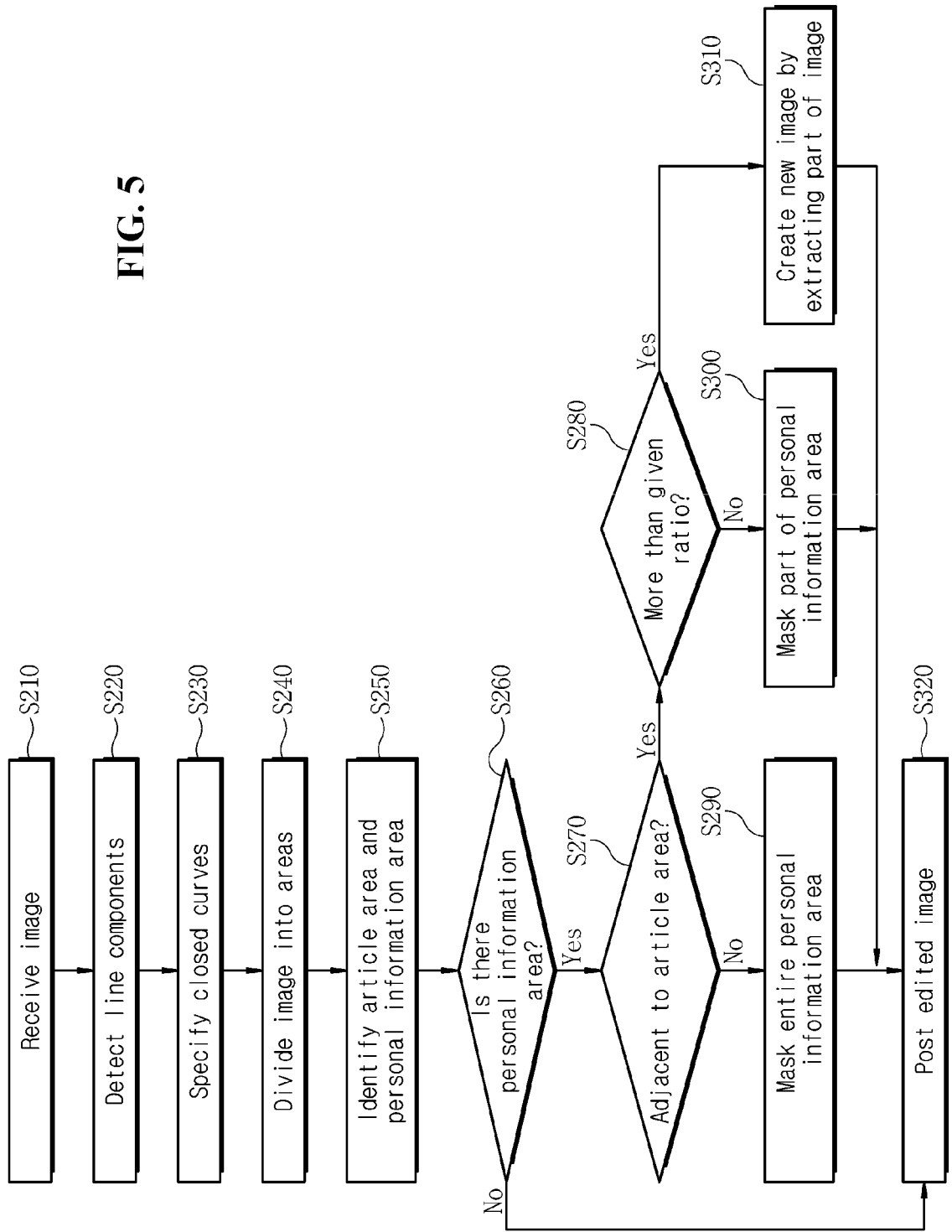
FIG. 5 is a flow diagram illustrating a method for editing an image according to an embodiment of the present disclosure.
Figure 6:
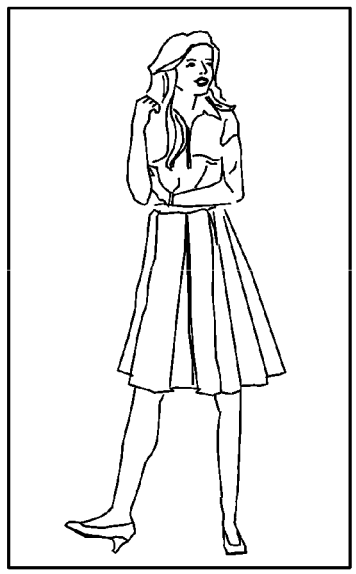
FIGS. 6 to 8 show examples of an image edit according to an embodiment of the present disclosure.
Figure 6:
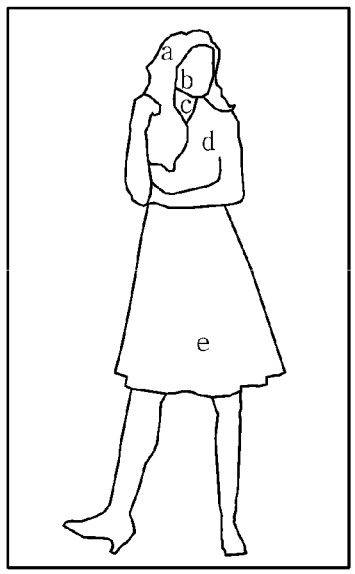
Figure 6:
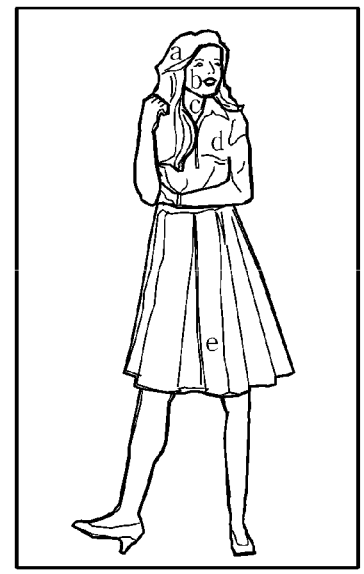
Figure 6:
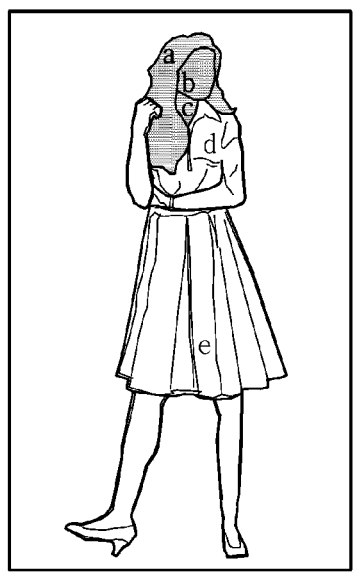
Figure 6:
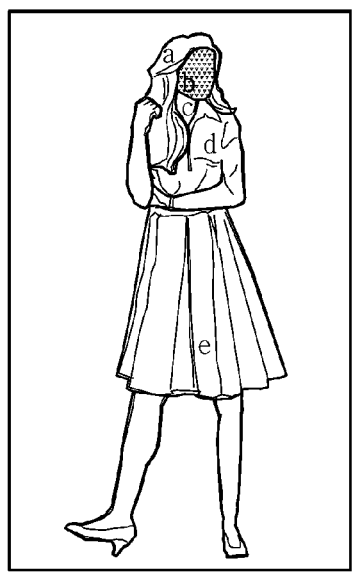
Figure 7:
Figure 7:
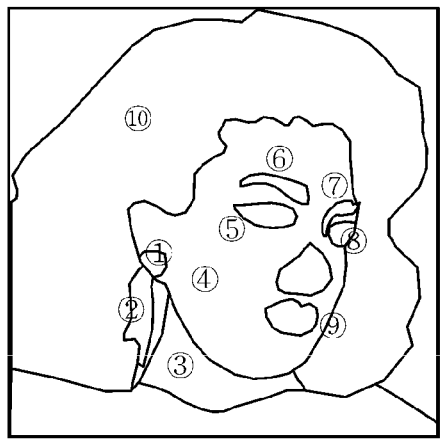
Figure 7:
Figure 7:
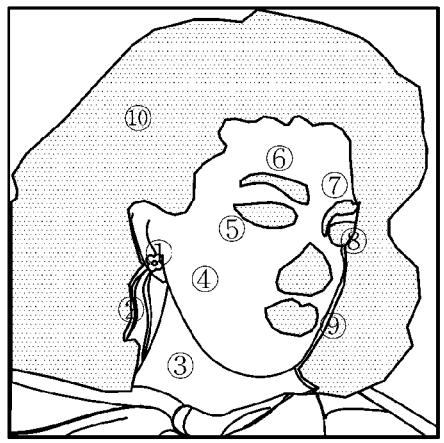
Figure 8:
Figure 8:
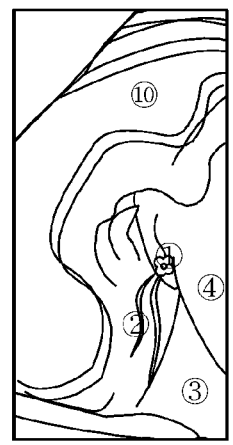

Now, the above-described image editing step S140 will be described in more detail. FIG. 5 is a flow diagram illustrating a method for editing an image according to an embodiment of the present disclosure. FIGS. 6 to 8 show examples of an image edit according to an embodiment of the present disclosure.

Referring to FIG. 5, at step S210, the image analyzer 131 of the controller 130 receives an uploaded image included in a review from the user device 200 through the communication circuit 110.

Then, at step S220, the image analyzer 131 detects line components from the received image through morphology analysis. Specifically, the image analyzer 131 removes noise from the received image by using a Gaussian filter. Part (A) of FIG. 6 shows an example of the received image. Then, the image analyzer 131 performs a convolution operation with a Sobel mask having a predetermined size (e.g., 3*3, 5*5, 9*9) with respect to each pixel of the noise-removed image, and thereby calculates the size and direction of an edge gradient vector. Then, the image analyzer 131 primarily selects line components by leaving only a pixel having the maximum gradient vector value in the gradient vector direction through a window of a predetermined size and also by assigning zero to the remaining pixels. Next, the image analyzer 131 connects the primarily selected line components by tracking the respective pixels in the gradient direction through a hysteresis threshold technique. As a result, the connected line components are detected. That is, from the image as shown in part (A) of FIG. 6, the image analyzer 131 can detect the line components as shown in part (B) of FIG. 6.

Then, at step S230, the image analyzer 131 specifies a plurality of closed curves from the detected line components. In addition, at step S240, the image analyzer 131 divides the received image into a plurality of areas, based on the closed curves. For example, based on the closed curves as shown in part (B) of FIG. 6, the received image may be divided into five areas "a", "b", "c", "d", and "e" as shown in part (C) of FIG. 6.

Then, at step S250, the image analyzer 131 identifies an article area and a personal information area from the respective areas in the received image by recognizing an image of each area. For example, the image analyzer 131 can recognize the type of the purchased article through the text uploaded together with the received image or through the webpage to which the received image is uploaded. Then, using an image recognition technique for the recognized article type, the image analyzer 131 can check whether there is a corresponding article image in each individual area. That is, a certain area having the corresponding article image is identified as the article area. In addition, using a face recognition technique, the image analyzer 131 can check whether there is a face image in each individual area. That is, a certain area having the face image is identified as the personal information area. For example, when the article type is recognized as a woman's top and a skirt in the received image as shown in part (C) of FIG. 6, the areas "d" and "e" are identified as the article areas. Also, the remaining areas "a", "b", and "c" are identified as the personal information areas.

Next, based on a result obtained at step S250, the image analyzer 131 determines at step S260 whether there is the personal information area among the plurality of areas of the received image. If it is determined at step S260 that the personal information area does not exist in the received image, step S320 will be performed. On the other hand, if it is determined at step S260 that the personal information area exists in the received image, steps S270 to S310 will be performed.

At step S270, the image analyzer 131 determines whether the personal information area is adjacent to the article area. In an example as shown in part (C) of FIG. 6, when the article type is recognized as a woman's top, the area "d" becomes the article area. In this example, the personal information areas "a" and "c" are adjacent to the article area "d", whereas the personal information area "b" is not adjacent to any article area. If the image processing (e.g., masking) is performed for the personal information areas "a" and "c", the article area "d" may be damaged due to an effect of the image processing. In another example, when the article type is recognized as a skirt, the area "e" becomes the article area. In this example, none of the personal information areas "a", "b" and "c" are adjacent to the article area "e". Therefore, even when the image processing (e.g., masking) is performed for the personal information areas, the article area "e" is not affected.

If it is determined at step S270 that there is no personal information area adjacent to the article area, step S290 will be performed. On the other hand, if it is determined at step S270 that there is the personal information area adjacent to the article area, step S280 will be performed.

At step S280, the image analyzer 131 determines whether a ratio occupied by the personal information area in the entire image is greater than a given ratio (e.g., 50%). In an example as shown in FIG. 6, the personal information area occupies less than 50% of the entire image. However, in another example as shown in FIGS. 7 and 8, the personal information area occupies more than 50% of the entire image.

If it is determined at step S280 that the ratio of the personal information area is less than the given ratio, step S300 will be performed. On the other hand, if it is determined at step S280 that the ratio of the personal information area is more than the given ratio, step S310 will be performed.

After the above operations of the image analyzer 131, the image processor 133 performs the following operations.

In the first case where the received image contains the personal information area and where there is no personal information area adjacent to the article area, the image processor 133 performs at step S290 an image editing process by masking the entire personal information area so as not to expose personal information. For example, referring to part (D) of FIG. 6, when the article type is recognized as a skirt, the area "e" is the article area, and none of the personal information areas "a", "b" and "c" are adjacent to the article area "e". Therefore, in this case, the image processor 133 may mask all of the personal information areas "a", "b" and "c". For example, the masking may be performed through scrambling.

In the second case where there is the personal information area adjacent to the article area and where the ratio occupied by the personal information area is smaller than a given ratio, the image processor 133 performs at step S300 an image editing process by masking a part of the personal information area so as not to expose personal information without damaging the article area. For example, the image processor 133 may mask only the personal information area which is not adjacent to the article area.

Referring to part (E) of FIG. 6, when the article type is a woman's top, the area "d" is the article area. Also, the personal information area "a" is adjacent to a shoulder portion of the article area "d", and the personal information area "c" is adjacent to a collar portion of the article area "d". However, the personal information area "b" is not adjacent to the article area "d". Therefore, in this case, the image processor 133 may mask only the area "b" without masking the areas "a" and "c".

In the third case where there is the personal information area adjacent to the article area and where the ratio occupied by the personal information area is greater than a given ratio, the image processor 133 performs at step S310 an image editing process.

For example, referring to FIG. 7, by specifying the closed curves in the received image as shown in part (A) of FIG. 7, the image is divided into ten areas ① to ⑩ as shown in part (B) of FIG. 7. In addition, as shown in part (C) of FIG. 7, two areas ① and ② are identified as the article areas, and eight areas ③ to ⑩ are identified as the personal information areas. In this example, the article areas ① and ② are adjacent to the personal information areas ③ and ④. Therefore, as performed at step S300, the personal information areas ⑤ to ⑩ which are not adjacent to the article areas may be masked. A resultant image is shown in part (D) of FIG. 7. By the way, although the areas ⑤ to ⑩ (i.e., eyes, eyebrows, nose, mouth, and hair) are masked, personal information protection is not perfect. That is, because a face occupying a large portion of the personal information area is not masked, privacy protection is not sufficient. As such, when the ratio of the personal information area is more than a given ratio, the personal information may not be protected by masking a part of the personal information area.

Therefore, when there is the personal information area adjacent to the article area and when the ratio occupied by the personal information area in the entire image is greater than a given ratio, the image processor 133 creates at step S310 a new image by extracting a part of the entire image so as not to expose the personal information without managing the article area. For example, as shown in part (E) of FIG. 8, the personal information areas ③ and ④ which are adjacent to the article areas ① and ② are partially extracted to create a new image. The new image is shown in part (F) of FIG. 8. As such, the personal information can be protected at the same time as the article area is not damaged.

Finally, at step S320, the image processor 133 posts the image edited at step S290, S300, or S310 on the bulletin board of the webpage as the review.

As described above, the review image uploaded to the website is edited, before posted, to protect personal information contained in the image in accordance with a relationship between the article area and the personal information area. Accordingly, the user can upload the review image to the website without worrying about leakage of his/her personal information.

As fully described heretofore, the present disclosure contains many specific implementation details, but these should not be construed as limitations on the scope of any disclosure or of what may be claimed. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Also, although the present disclosure describes that operations are performed in a predetermined order with reference to a drawing, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

While this disclosure has been particularly shown and described with reference to an exemplary embodiment thereof, it will be understood by those skilled in the art that various changes in form and details may be made therein without departing from the scope of this disclosure as defined by the appended claims.

In addition, the present disclosure has a good possibility of sales on the market or business and therefore has industrial applicability suitable for practical and apparent implementation.

What is claimed is:

1. A method for editing an uploaded image, performed by a controller of an apparatus, the method comprising:
   receiving a review of an article purchased by a reviewer of the article, the review including an uploaded image and text associated with the review of the article, wherein the uploaded image includes an article area showing an image of the article purchased by the reviewer and a personal information area indicative of an identity of the reviewer;
   identifying an article type associated with the article from the text of the review;
   identifying the article area and the personal information area in the uploaded image, the article area identified based on the identified article type included in the text of the review;
   editing the uploaded image to distort the personal information area without distorting the article area; and
   posting the review to a webpage, the review including the edited image and the text.

2. The method of claim 1, wherein the editing of the uploaded image includes:
   determining whether the personal information area is adjacent to the article area; and
   when the personal information area is not adjacent to the article area, masking all of the personal information area.

3. The method of claim 2, wherein the editing of the uploaded image further includes:
   when the personal information area is adjacent to the article area, determining whether a ratio of a size of the personal information area in the uploaded image and a size of an entire area of the uploaded image is greater than a threshold; and
   when the ratio is less than the threshold, masking a part of the personal information area without masking the personal information area in its entirety.

4. The method of claim 3, wherein the editing of the uploaded image further includes:
   when the ratio is greater than the threshold, creating a new image by extracting a portion of the personal information area that is less than the personal information area, the new image including a portion of the uploaded image that is less than the uploaded image, the portion of the uploaded image corresponding to the partially extracted personal information area.

5. The method of claim 1, wherein the identifying of the article area and the personal information area includes:
   detecting line components from the uploaded image through morphology analysis;
   specifying a plurality of closed curves from the detected line components;
   dividing the uploaded image into a plurality of areas, based on the closed curves; and
   identifying the article area and the personal information area from the respective areas in the uploaded image by recognizing an image of each area.

6. The method of claim 1, wherein the image shown in the article area is of the reviewer using the purchased article.

7. The method of claim 6, wherein the personal information area indicative of the identity of the reviewer is an image of a face of the reviewer.

8. An apparatus for editing an uploaded image, comprising:
   a communication circuit configured to receive a review of an article purchased by a reviewer of the article from a device of the reviewer, the review including an uploaded image and text associated with the review of the article, wherein the uploaded image includes an article area showing an image of the article purchased by the reviewer and a personal information area indicative of an identity of the reviewer; and
   a controller configured to:
   receive the review of the article from the communication circuit,
   identify an article type associated with the article from the text of the review;
   identify the article area and the personal information area in the uploaded image,
      the article area identified based on the identified article type included in the text of the review,
   edit the uploaded image to distort the personal information area without distorting the article area, and
   post the review to a webpage, the review including the edited image and the text.

9. The apparatus of claim 8, wherein the controller is further configured to:
   determine whether the personal information area is adjacent to the article area, and
   when the personal information area is not adjacent to the article area, mask all of the personal information area.

10. The apparatus of claim 9, wherein the controller is further configured to:
    when the personal information area is adjacent to the article area, determine whether a ratio of a size of the personal information area in the uploaded image and a size of an entire area of the uploaded image is greater than a threshold, and
    when the ratio is less than the threshold, mask a part of the personal information area without masking the personal information area in its entirety.

11. The apparatus of claim 10, wherein the controller is further configured to:
    when the ratio is greater than the threshold, create a new image by extracting a portion of the personal information area that is less than the personal information area, the new image including a portion of the uploaded image that is less than the uploaded image, the portion of the uploaded image corresponding to the partially extracted personal information area.

12. The apparatus of claim 8, wherein the controller is further configured to:
    detect line components from the uploaded image through morphology analysis,
    specify a plurality of closed curves from the detected line components,
    divide the uploaded image into a plurality of areas, based on the closed curves, and
    identify the article area and the personal information area from the respective areas in the uploaded image by recognizing an image of each area.

* * * * *